US011440563B2

(12) United States Patent
Kumano et al.

(10) Patent No.: US 11,440,563 B2
(45) Date of Patent: Sep. 13, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Takayasu Kumano, Wako (JP); Aditya Mahajan, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 16/910,129

(22) Filed: Jun. 24, 2020

(65) Prior Publication Data

US 2020/0406920 A1 Dec. 31, 2020

(30) Foreign Application Priority Data

Jun. 28, 2019 (JP) .............................. JP2019-121019

(51) Int. Cl.
*B60W 60/00* (2020.01)
*B60W 30/095* (2012.01)
(Continued)

(52) U.S. Cl.
CPC .......... *B60W 60/001* (2020.02); *B60W 30/09* (2013.01); *B60W 30/0956* (2013.01);
(Continued)

(58) Field of Classification Search
CPC ............... B60W 60/001; B60W 30/09; B60W 30/0956; B60W 30/16; B60W 2554/4042;
(Continued)

(56) References Cited

U.S. PATENT DOCUMENTS

2005/0256630 A1* 11/2005 Nishira .................. G08G 1/167
701/96
2016/0297447 A1* 10/2016 Suzuki ............ B60W 30/18163
(Continued)

FOREIGN PATENT DOCUMENTS

| JP | 2002-307976 | 10/2002 |
| JP | 2005-324727 | 11/2005 |
| JP | 6330550 B2 * | 5/2018 |

OTHER PUBLICATIONS

Japanese Office Action for Japanese Patent Application No. 2019-121019 dated Mar. 15, 2022.

*Primary Examiner* — Abby Y Lin
*Assistant Examiner* — Danielle Marie Jackson
(74) *Attorney, Agent, or Firm* — Amin, Turocy & Watson, LLP

(57) ABSTRACT

A vehicle control device includes: a recognizer configured to recognize a surrounding situation of a vehicle; and an action controller configured to control an action of the vehicle. The action controller is configured to specify a first vehicle in front of a region which the vehicle is scheduled to enter and a second vehicle behind the region according to inter-vehicle distances between a plurality of vehicles located in front of or on the side of the vehicle in a lane of a route changing destination recognized by the recognizer when a route of the vehicle is changed to a side. The action controller is configured to cause the vehicle to move to a vicinity of the specified first and second vehicles in a lane in which the vehicle is traveling.

16 Claims, 13 Drawing Sheets

(51) Int. Cl.
*B60W 30/16* (2020.01)
*G01C 21/34* (2006.01)
*B60W 30/09* (2012.01)
*G06V 20/58* (2022.01)

(52) U.S. Cl.
CPC ......... *B60W 30/16* (2013.01); *G01C 21/3407* (2013.01); *G06V 20/58* (2022.01)

(58) Field of Classification Search
CPC ....... B60W 2554/4049; B60W 30/143; B60W 30/18163; B60W 40/02; B60W 2554/80; G01C 21/3407; G01C 21/3602; G06V 20/58; G06V 20/588
See application file for complete search history.

(56) References Cited

U.S. PATENT DOCUMENTS

| | | | |
|---|---|---|---|
| 2017/0008531 A1* | 1/2017 | Watanabe | B60W 30/18163 |
| 2018/0170388 A1* | 6/2018 | Shin | G05D 1/0088 |
| 2019/0004529 A1* | 1/2019 | Im | B60W 30/00 |
| 2020/0079380 A1* | 3/2020 | Yu | G06N 3/04 |
| 2020/0290619 A1* | 9/2020 | Mehdi | G05D 1/0217 |

* cited by examiner

| FIRST MODE | SECOND MODE | NORMAL MODE |
|---|---|---|
| PERFORM SPECIFIC CONTROL ALLOW FIRST ACCELERATION | PERFORM SPECIFIC CONTROL ALLOW SECOND ACCELERATION WITHOUT ALLOWING FIRST ACCELERATION FIRST ACCELERATION > SECOND ACCELERATION | DO NOT PERFORM SPECIFIC CONTROL |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-121019, filed Jun. 28, 2019, the content of which is incorporated herein by reference.

BACKGROUND

Field

The present invention relates to a vehicle control device, a vehicle control method, and a storage medium.

Description of Related Art

In recent years, a driving support device of a lane changing support device that calculates an appropriate speed range appropriate for allowing an own vehicle to change its lane during a set time range and sets a target speed of the own vehicle from the calculated appropriate speed range with regard to gaps between vehicles formed by a vehicle group traveling in a target lane for a lane change is known (for example, Japanese Unexamined Patent Application, First Publication No. 2005-324727).

SUMMARY

In the technology of the related art, however, control of a vehicle may not be performed with precision in some cases in accordance with a surrounding situation.

The present invention is devised in view of such circumstances and an objective of the present invention is to provide a vehicle control device, a vehicle control method, and a storage medium capable of controlling a vehicle with high precision in accordance with a surrounding situation.

A vehicle control device, a vehicle control method, and a storage medium according to the present invention adopt the following configurations.

(1) According to an aspect of the present invention, a vehicle control device includes: a recognizer configured to recognize a surrounding situation of a vehicle; and an action controller configured to control an action of the vehicle. The action controller is configured to specify a first vehicle in front of a region which the vehicle is scheduled to enter and a second vehicle behind the region according to inter-vehicle distances (spaces) between a plurality of vehicles located in front of or on the side of the vehicle in a lane of a route changing destination recognized by the recognizer when a route of the vehicle is changed to a side. The action controller is configured to cause the vehicle to move to a vicinity of the specified first and second vehicles in a lane in which the vehicle is traveling.

(2) In the vehicle control device according to the aspect (1), the first and second vehicles may be two vehicles forming a longest inter-vehicle distance.

(3) In the vehicle control device according to the aspect (1), when a difference between a first inter-vehicle distance which is an inter-vehicle distance between the respective vehicles and a second inter-vehicle distance between the respective vehicles is equal to or less than a threshold, wherein the second inter-vehicle distance is an inter-vehicle distance longer than the first inter-vehicle distance, the action controller may specify two vehicles forming the first inter-vehicle distance as the first and second vehicles. The first vehicle may be a vehicle which is in front of two vehicles forming the second inter-vehicle distance.

(4) In the vehicle control device according to the aspect (3), the first vehicle may be a vehicle which is a forefront vehicle among the vehicles forming the inter-vehicle distance.

(5) In the vehicle control device according to the aspect (1), the action controller may predict a distribution of a position to which the vehicle is able to move and a position of a vehicle near the vehicle at a time after a predetermined time, and may specify, as the second vehicle, a nearby vehicle which is in a side direction of the position to which the vehicle is able to move or is behind the position at the time after the predetermined time.

(6) In the vehicle control device according to the aspect (1), the action controller may predict a time of arrival at a reference position in front of the vehicle and a distribution of positions of vehicles near the vehicle at the time, and may specify a nearby vehicle which is in a side direction of or behind the vehicle at the time as the second vehicle.

(7) In the vehicle control device according to the aspect (5) or (6), the action controller may specify, as the first and second vehicles, two vehicles forming the longest inter-vehicle distance among nearby vehicles in the side direction of or behind the vehicle at the time, may specify, as the first and second vehicles, two vehicles forming the inter-vehicle distance equal to or greater than a predetermined value among the nearby vehicles in the side direction of or behind the vehicle at the time or specify, as the second vehicle, a vehicle which forms the inter-vehicle distance equal to or greater than the predetermined value and is closest to the vehicle among the nearby vehicles in the side direction of or behind the vehicle at the time, and may specify a vehicle in front of the second vehicle as the first vehicle.

(8) In the vehicle control device according to any one of the aspects (1) to (7), the action controller may cause the vehicle to change the route to a region between the first and second vehicles after the action controller causes the vehicle to move to a vicinity of sides of the first and second vehicles.

(9) In the vehicle control device according to the aspect (8), the action controller may cause the vehicle to express an intention to try to change the route, and may cause the vehicle to change the route to a front of the vehicle which is behind the second vehicle when the second vehicle is predicted to have no intention to permit the change in the route.

(10) In the vehicle control device according to any one of the aspects (1) to (9), the action controller may perform control such that the vehicle moves to a vicinity of sides of the specified first and second vehicles when a vehicle speed of a vehicle which is at least in the lane of the route changing destination of the vehicle is equal to or greater than a predetermined vehicle speed, and may perform different control from the control such that the vehicle moves to the vicinity of the sides of the specified first and second vehicles when the vehicle speed of the vehicle which is at least in the lane of the route changing destination of the vehicle is less than a predetermined vehicle speed.

(11) In the vehicle control device according to any one of the aspects (1) to (10), the action controller may perform control such that the vehicle moves to a vicinity of sides of the specified first and second vehicles when a distance to a vehicle which is in front of the vehicle at least in the lane in which the vehicle is traveling is equal to or greater than a predetermined distance, and may perform other control different from the control such that the vehicle moves to the vicinity of the sides of the specified first and second vehicles when the distance to the vehicle which is in front of the vehicle at least in the lane in which the vehicle is traveling is not equal to or greater than the predetermined distance.

(12) In the vehicle control device according to any one of the aspects (1) to (11), the action controller is configured to specify the first vehicle which is in front of the region which the vehicle is scheduled to enter and the second vehicle which is behind the region based on a time at which the vehicle approaches each target vehicle included in the plurality of vehicles, and an inter-vehicle distance between the target vehicle and a vehicle in front of the target vehicle or a vehicle behind the target vehicle at the time at which the vehicle approaches each target vehicle, wherein the time at which the vehicle approaches each target vehicle is derived according to displacements of speeds of the plurality of vehicles and an allowed acceleration of the vehicle.

(13) In the vehicle control device according to any one of the aspects (1) to (12), the action controller may perform a mode selected from a plurality of modes including at least a specific control mode, and may cause the vehicle to move to a vicinity of the specified first and second vehicles in the lane in which the vehicle is traveling when the specific control mode is selected.

(14) In the vehicle control device according to the aspect (13), the action controller may perform a mode selected from a plurality of modes including at least a specific control mode and is configured to perform the specific control mode when the vehicle is predicted to arrive at a set destination later than a target time. The specific control mode may be a mode in which control is performed such that the vehicle moves to a vicinity of the specified first and second vehicles in the lane in which the vehicle is traveling.

(15) According to another aspect of the present invention, there is provided a vehicle control method causing a computer to perform: recognizing a surrounding situation of a vehicle; controlling an action of the vehicle; specifying a first vehicle in front of a region which the vehicle is scheduled to enter and a second vehicle behind the region according to inter-vehicle distances between a plurality of vehicles located in front of or on the side of the vehicle in a lane of a route changing destination recognized by the recognizer when a route of the vehicle is changed to a side; and causing the vehicle to move to a vicinity of the specified first and second vehicles in a lane in which the vehicle is traveling.

(16) According to still another aspect of the present invention, a non-transitory computer-readable storage medium stores a computer program to be executed by a computer to perform at least: recognizing a surrounding situation of a vehicle; controlling an action of the vehicle; specifying a first vehicle in front of a region which the vehicle is scheduled to enter and a second vehicle behind the region according to inter-vehicle distances between a plurality of vehicles located in front of or on the side of the vehicle in a lane of a route changing destination recognized by the recognizer when a route of the vehicle is changed to a side; and causing the vehicle to move to a vicinity of the specified first and second vehicles in a lane in which the vehicle is traveling.

According to the aspects (1), (8), (13), (15), and (16), the action controller is configured to cause the vehicle to move to the vicinity of the specified first and second vehicles in the lane in which the vehicle is traveling. Thus, it is possible to control the vehicle with higher precision in accordance with a surrounding situation.

According to the aspect (2), the action controller is configured to specify the two vehicles forming the longest inter-vehicle distance as the first and second vehicles. Thus, it is possible to change the route more smoothly.

According to the aspects (3) and (4), the action controller can change the route to a space between more front two vehicles. As a result, the vehicle can head for a destination more quickly.

According to the aspects (5) to (7) and (10), the action controller is configured to predict future positions of the vehicle and the nearby vehicle, adds a prediction result, and is configured to specify the first and second vehicles. Thus, it is possible to realize control of the vehicle further in accordance with a surrounding situation.

According to the aspect (9), the action controller changes other vehicles as the first and second vehicles according to an intention of the second vehicle. Thus, it is possible to change the route more reliably.

According to the aspects (11) and (12), the action controller is configured to perform specific control in a situation in which necessity to perform the specific control such that the vehicle moves to the vicinity of the first and second vehicles is high. Thus, it is possible to further improve convenience for a user.

According to the aspect (14), the action controller is configured to perform the specific control when necessity to head for the destination quickly is high. It is possible to further improve convenience for the user.

DESCRIPTION OF EMBODIMENTS

Hereinafter, embodiments of a vehicle control device, a vehicle control method, and a storage medium according to the present invention will be described with reference to the drawings.

First Embodiment

[Overall Configuration]

Figure 1:
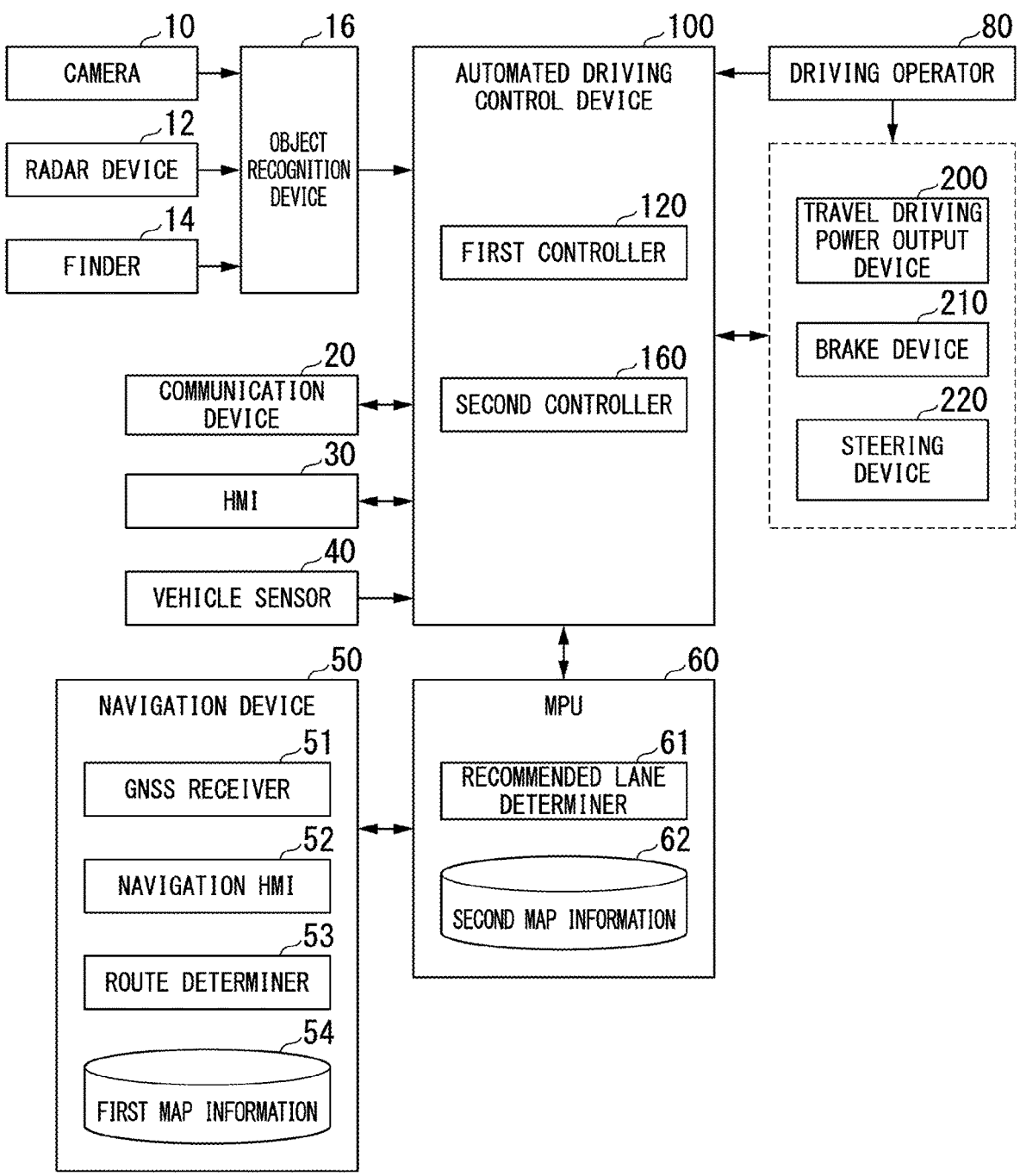
FIG. 1 is a diagram showing a configuration of a vehicle system in which a vehicle control device according to an embodiment is used.

FIG. 1 is a diagram showing a configuration of a vehicle system 1 in which a vehicle control device according to an embodiment is used. A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, and a combination thereof. The electric motor operates using power generated by a power generator connected to the internal combustion engine or power discharged from a secondary cell or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving power output device 200, a brake device 210, and a steering device 220. The devices and units are connected to one another via a multiplex communication line such as a controller area network (CAN) communication line, a serial communication line, or a wireless communication network. The configuration shown in FIG. 1 is merely an exemplary example, a part of the configuration may be omitted, and another configuration may be further added.

The camera 10 is, for example, a digital camera that uses a solid-state image sensor such as a charged coupled device (CCD) or a complementary metal oxide semiconductor (CMOS). The camera 10 is mounted on any portion of a vehicle in which the vehicle system 1 is mounted (hereinafter referred to as an own vehicle M). When the camera 10 images a front side, the camera 10 is mounted on an upper portion of a front windshield, a rear surface of a rearview mirror, and the like. For example, the camera 10 repeatedly images the surroundings of the own vehicle M periodically. The camera 10 may be a stereo camera.

The radar device 12 radiates radio waves such as millimeter waves to the surroundings of the own vehicle M and detects radio waves (reflected waves) reflected from an object to detect at least a position (a distance and an azimuth) of the object. The radar device 12 is mounted on any portion of the own vehicle M. The radar device 12 may detect a position and a speed of an object in conformity with a frequency modulated continuous wave (FM-CW) scheme.

The finder 14 is a light detection and ranging (LIDAR) finder. The finder 14 radiates light to the surroundings of the own vehicle M and measures scattered light. The finder 14 detects a distance to a target based on a time from light emission to light reception. The radiated light is, for example, pulsed laser light. The finder 14 is mounted on any portions of the own vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automated driving control device 100. The object recognition device 16 may output detection results of the camera 10, the radar device 12, and the finder 14 to the automated driving control device 100 without any change. The object recognition device 16 may be excluded from the vehicle system 1.

The communication device 20 communicates with other vehicles around the own vehicle M using, for example, a cellular network, a Wi-Fi network, Bluetooth (registered trademark), dedicated short range communication (DSRC) or the like or communicates with various server devices via a wireless base station.

The HMI 30 presents various types of information to occupants of the own vehicle M and receives input operations by the occupants. The HMI 30 includes various display devices, speakers, buzzers, touch panels, switches, and keys.

The vehicle sensor 40 includes a vehicle speed sensor that detects a speed of the own vehicle M, an acceleration sensor that detects an acceleration, a yaw rate sensor that detects angular velocity around a vertical axis, and an azimuth sensor that detects a direction of the own vehicle M.

The navigation device 50 includes, for example, a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 specifies a position of the own vehicle M based on signals received from GNSS satellites. The position of the own vehicle M may be specified or complemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the own vehicle M specified by the GNSS receiver 51 (or any input position) to a destination input by an occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include a curvature of a road and point of interest (POI) information. The route on the map is output to the MPU 60. The navigation device 50 may perform route guidance using the navigation HMI 52 based on the route on the map. The navigation device 50 may be realized by, for example, a function of a terminal device such as a smartphone or a tablet terminal possessed by an occupant. The navigation device 50 may transmit a present position and a destination to a navigation server via the communication device 20 to acquire the same route as the route on the map from the navigation server.

The MPU 60 includes, for example, a recommended lane determiner 61 and retains second map information 62 in a storage device such as an HDD or a flash memory. The recommended lane determiner 61 divides the route on the map provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left. When there is a branching location in the route on the map, the recommended lane determiner 61 determines a recommended lane so that the own vehicle M can travel in a reasonable route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently by communicating with another device using the communication device 20.

The driving operator 80 includes, for example, an accelerator pedal, a brake pedal, a shift lever, a steering wheel, a heteromorphic steering wheel, a joystick, and other operators. A sensor that detects whether there is an operation or an operation amount is mounted in the driving operator 80 and a detection result is output to the automated driving control device 100 or some or all of the travel driving power output device 200, the brake device 210, and the steering device 220.

The automated driving control device 100 includes, for example, a first controller 120 and a second controller 160. Each of the first controller 120 and the second controller 160 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a storage device including a non-transitory storage medium) such as an HDD or a flash memory of the automated driving control device 100 or may be stored in a detachably mounted storage medium such as a DVD, a CD-ROM, or the like so that the storage medium (a non-transitory storage medium) is mounted on a drive device to be installed on the HDD or the flash memory of the automated driving control device 100. The automated driving control device 100 is an example of a "vehicle control device" and a combination of the action plan generator 140 and the second controller 160 is an example of an "action controller."

Figure 2:
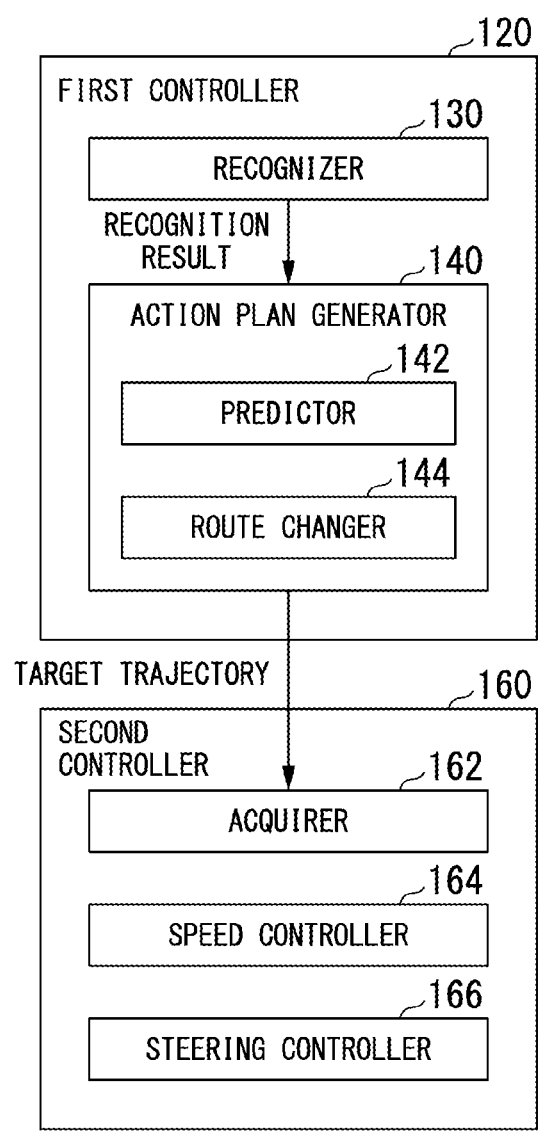
FIG. 2 is a diagram showing a functional configuration of a first controller and a second controller.

FIG. 2 is a diagram showing a functional configuration of the first controller 120 and the second controller 160. The first controller 120 includes, for example, a recognizer 130 and an action plan generator 140. The first controller 120 realizes, for example, a function by artificial intelligence (AI) and a function by a model given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The recognizer 130 recognizes a state such as a position, a speed, an acceleration of an object near the own vehicle M based on information input from the camera 10, the radar device 12, and the finder 14 via the object recognition device 16. For example, the position of the object is recognized as a position on the absolute coordinates in which a representative point (a center of gravity, a center of a driving shaft, or the like) of the own vehicle M is the origin and is used for control. The position of the object may be represented as a representative point such as a center of gravity, a corner, or the like of the object or may be represented as expressed regions. A "state" of an object may include an acceleration or jerk of the object or an "action state" (for example, whether a vehicle is changing a lane or is attempting to change the lane).

The action plan generator 140 generates a target trajectory along which the own vehicle M travels in future automatedly (irrespective of an operation or the like by a driver) so that the own vehicle M is traveling along a recommended lane determined by the recommended lane determiner 61 and can handle a surrounding situation of the own vehicle M in principle. The target trajectory includes, for example, a speed component. For example, the target trajectory is expressed by arranging spots (trajectory points) at which the own vehicle M will arrive in sequence. The trajectory point is a spot at which the own vehicle M will arrive for each predetermined traveling distance (for example, about several [m]) in a distance along a road. Apart from the trajectory points, a target acceleration and a target speed are generated as parts of the target trajectory for each of predetermined sampling times (for example, about a decimal point of a second). The trajectory point may be a position at which the own vehicle M will arrive at the sampling time for each predetermined sampling time. In this case, information regarding the target acceleration or the target speed is expressed according to an interval between the trajectory points.

The action plan generator 140 may set an automated driving event when the target trajectory is generated. As the automated driving event, there are a constant speed traveling event, a low-speed following traveling event, a lane changing event, a branching event, a joining event, a takeover event, and the like. The action plan generator 140 generates the first trajectory in accordance with an activated event.

The action plan generator 140 includes, for example, a predictor 142 and a route changer 144. These predictor 142 and the route changer 144 will be described later. The details of functions of the predictor 142 and the route changer 144 will be described later.

The second controller 160 controls the travel driving power output device 200, the brake device 210, and the steering device 220 so that the own vehicle M passes along the first trajectory generated by the action plan generator 140 at a scheduled time.

Referring back to FIG. 2, the second controller 160 includes, for example, an acquirer 162, a speed controller 164, and a steering controller 166. The acquirer 162 acquires information regarding a target trajectory (trajectory points) generated by the action plan generator 140 and stores the information in a memory (not shown). The speed controller 164 controls the travel driving power output device 200 or the brake device 210 based on a speed element incidental to the target trajectory stored in the memory. The steering controller 166 controls the steering device 220 in accordance with a curve state of the target trajectory stored in the memory. Processes of the speed controller 164 and the steering controller 166 are realized, for example, by combining feed-forward control and feedback control. For example, the steering controller 166 performs the feed-forward control in accordance with a curvature of a road in front of the own vehicle M and the feedback control based on separation from the target trajectory in combination.

The travel driving power output device 200 outputs a travel driving power (torque) for traveling the vehicle to a driving wheel. The travel driving power output device 200 includes, for example, a combination of an internal combustion engine, an electric motor, and a transmission and an electronic control unit (ECU) controlling them. The ECU controls the foregoing configuration in accordance with information input from the second controller 160 or information input from the driving operator 80.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second controller 160 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second controller 160 or information input from the driving operator 80.

[Overview of Specific Control]

When the route of the vehicle M is changed to a side of the vehicle M, the action plan generator 140 specifies a first vehicle in front of a target region (a region which the vehicle is scheduled to enter) and a second vehicle behind the target region based on inter-vehicle distances (spaces) between a plurality of vehicles located in front of or on the side of the vehicle M in a lane of a route changing destination recognized by the recognizer 130 (to which the route is scheduled to be changed). The action plan generator 140 causes the vehicle M to move to a vicinity of the specified first and second vehicles in the lane in which the vehicle M is traveling. This control is referred to as "specific control" below in some cases.

The "plurality of vehicles" are vehicles forming a motorcade in front of (for example, several tens to several hundreds of meters in front of) or on a side of the vehicle M. The "plurality of vehicles located in front of the vehicle M in the lane of the route changing destination" are vehicles of which a standard position is in front of a standard position (for example, a front end) of the vehicle M in the lane of the route changing destination. The "plurality of vehicles located in front of the vehicle M" are, for example, vehicles located at distances of several tens to hundreds of meters in front of the vehicle M in the lane of the route changing destination. The "plurality of vehicles located on the side of the vehicle M in the lane of the route changing destination" are, for example, vehicles located within a range of several tens to several hundreds of meters in a traveling direction (front and rear directions) of the vehicle M in the lane of the route changing destination.

For example, when the route of the vehicle M is changed to the side, the action plan generator 140 may compare an average speed of vehicles in the traveling lane with an average speed of vehicles in an adjacent lane and may set the vehicles located in front as the plurality of vehicles or set the vehicles located on the side as the plurality of vehicles based on a comparison result. For example, when a difference between the average speed of the vehicles in the traveling lane and the average speed of the vehicles in the adjacent lane is equal to or greater than a standard speed, the vehicles located on the side may be considered as the plurality of vehicles. When the difference between the average speed of the vehicles in the traveling lane and the average speed of the vehicles in the adjacent lane is less than the standard speed, the vehicles located in front may be considered as the plurality of vehicles. The average speed of the vehicles in the traveling lane is an average speed per unit time of the vehicle M or the other vehicles traveling in the traveling lane. The average speed of the vehicle in the adjacent lane is the average speed per unit time of the vehicles traveling in the adjacent lane.

In this way, when it is predicted that there is a high possibility of the vehicle M accelerating to a predetermined extent and passing a vehicle traveling in the adjacent lane, vehicles in front may be set as the plurality of vehicles that are targeted. When there is a low probability of the vehicle M passing a vehicle traveling in the adjacent lane while accelerating to the predetermined extent, the vehicles on the side may be set as the plurality of vehicles that are targeted.

In the following description, a process when the vehicle M changes its lane will be described. However, the process may be realized even when the vehicle M changes its route. The change in the route is movement of the vehicle M to a space between two vehicles included in the motorcade on the side of a position at which the vehicle M is traveling, for example, when a lane is not present or not regulated clearly.

[Specific Control (Part 1)]

Figure 3:
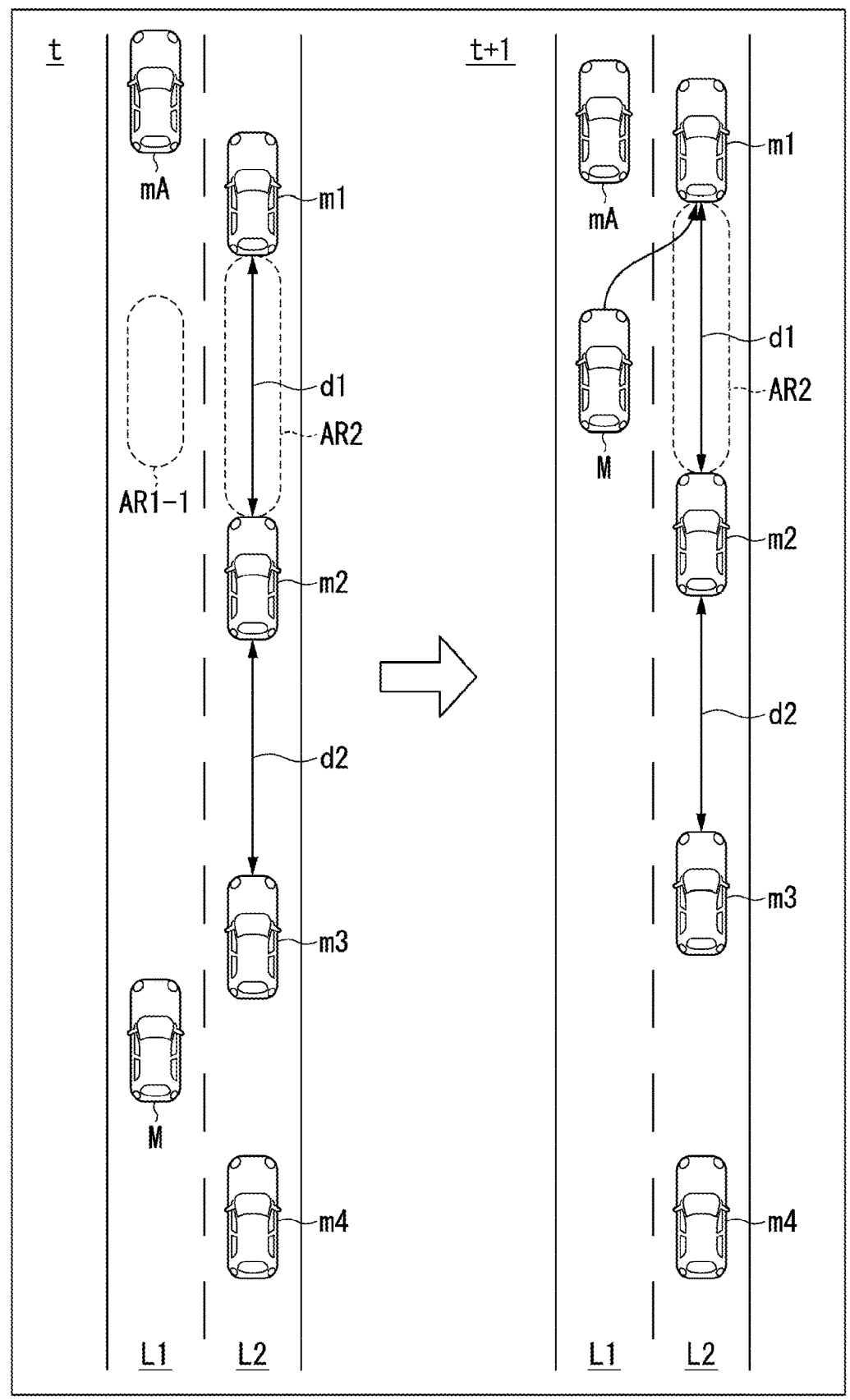
FIG. 3 is a diagram showing specific control.

FIG. 3 is a diagram showing specific control. For example, a road includes a first lane L1 and a second lane L2 adjacent to the first lane L1. In the first lane L1, the vehicle M is traveling behind a front vehicle mA. In the second lane L2, a first vehicle m1, a second vehicle m2, a third vehicle m3, and a fourth vehicle m4 are traveling in that order.

At time t, the vehicle M is traveling behind the third vehicle m3. The term "behind" means, for example, that a standard position of the vehicle M is behind a standard position of the third vehicle m3. When the vehicle M changes its route to a side, that is, when the vehicle M changes its lane to the second lane L2, the following control is performed. For example, when speeds (for example, an average speed for a predetermined time) of the vehicles traveling in the second lane L2 are greater than speeds of the vehicles traveling in the first lane L1, the vehicle M determines to change its lane to the second lane L2 so that the vehicle M will arrive at a destination quickly.

The action plan generator 140 derives inter-vehicle distances between a plurality of vehicles located in front of (to a side of) the vehicle M. The plurality of vehicles are, for example, the first vehicle m1, the second vehicle m2, and the third vehicle m3. The inter-vehicle distances between the plurality of vehicles are an inter-vehicle distance d1 between the first vehicle m1 and the second vehicle m2 and an inter-vehicle distance d2 between the second vehicle m2 and the third vehicle m3.

When the route changer 144 of the action plan generator 140 determines to enter a space between the first vehicle m1 (the first vehicle) and the second vehicle m2 (the second vehicle) based on the foregoing inter-vehicle distances, as shown at time t+1 of FIG. 3, the vehicle M is caused to move to a vicinity of the first vehicle m1 and the second vehicle m2. The "vicinity" is, for example, a vicinity of a region AR1-1 in which a first distance between the first vehicle m1 and the vehicle M is equal to a second distance between the second vehicle m2 and the vehicle M in the first lane L1. For example, the route changer 144 controls the vehicle M such that a standard point (for example, a center of gravity or the like in the traveling direction) of the vehicle M matches a center of the inter-vehicle distance between the first vehicle m1 and the second vehicle m2 in the traveling direction. Then, the route changer 144 causes the vehicle M to change its lane to a target region AR2 between the first vehicle m1 and the second vehicle m2 at a predetermined timing as shown at time t+1 of FIG. 3.

For example, the route changer 144 determines the target region as follows.

(1) The route changer 144 determines a region between vehicles forming the longest inter-vehicle distance among the inter-vehicle distances between the plurality of respective vehicles as the target region. For example, the route changer 144 causes the vehicle M to move to the vicinity of the first vehicle m1 and the second vehicle m2 forming the inter-vehicle distance d1 when the inter-vehicle distance d1 is greater than the inter-vehicle distance d2.

(2) The route changer 144 determines the target region. The target region is a region forming an inter-vehicle distance equal to or greater than a threshold among the inter-vehicle distances between the plurality of respective vehicles and presenting between the foremost vehicles.

Figure 4:
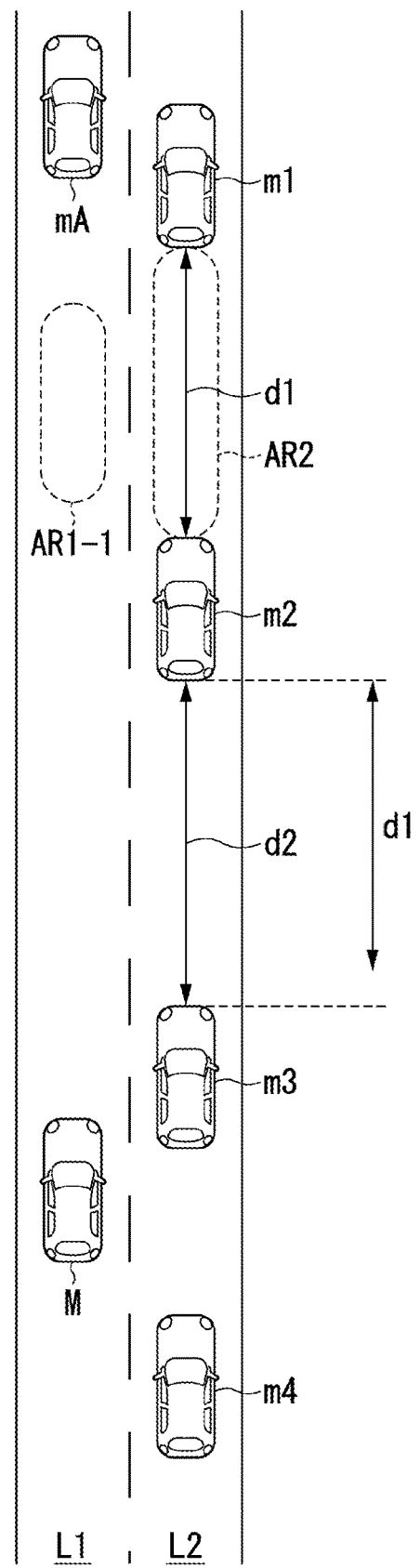
FIG. 4 is a diagram showing a process of determining a target region.

(3) When a difference between the first inter-vehicle distance which is an inter-vehicle distance between the respective vehicles and the second inter-vehicle distance longer than the first inter-vehicle distance is equal to or less than the threshold, as shown in FIG. 4 described below, the route changer 144 specifies two vehicles forming the first inter-vehicle distance as the first and second vehicles and determines a region between the first and second vehicles as the target region. The first vehicle is a vehicle in front of two vehicles forming the second inter-vehicle distance. When there are a plurality of regions in which the difference from the second inter-vehicle distance equal to or less than the threshold is the inter-vehicle distance, the forefront region is set as the target region.

FIG. 4 is a diagram showing a process of determining a target region. For example, when the inter-vehicle distance d1 is shorter than the inter-vehicle distance d2 and a difference between the inter-vehicle distances d1 and d2 is equal to or less than a threshold, the route changer 144 performs changing its lane by causing the vehicle M to move to the region AR1-1 in the vicinity of the first vehicle m1 and the second vehicle m2 forming the inter-vehicle distance d1 in order to change the lane to a more front position (for example, the target region AR2).

In this way, the route changer 144 controls the vehicle such that the vehicle M changes its lane to a more front side, and thus the vehicle M can arrive at the destination more quickly.

[Specific Control (Part 2)]

The predictor 142 predicts a distribution of positions to which the vehicle M can move and positions of the vehicles near the vehicle M at a time after the predetermined time. The predictor 142 specifies a nearby vehicle in the side direction of or behind a position to which the vehicle M can move as the second vehicle after the predetermined time. For example, the predictor 142 predicts a distribution of future positions based on past and current speeds of the nearby vehicles.

Figure 5:
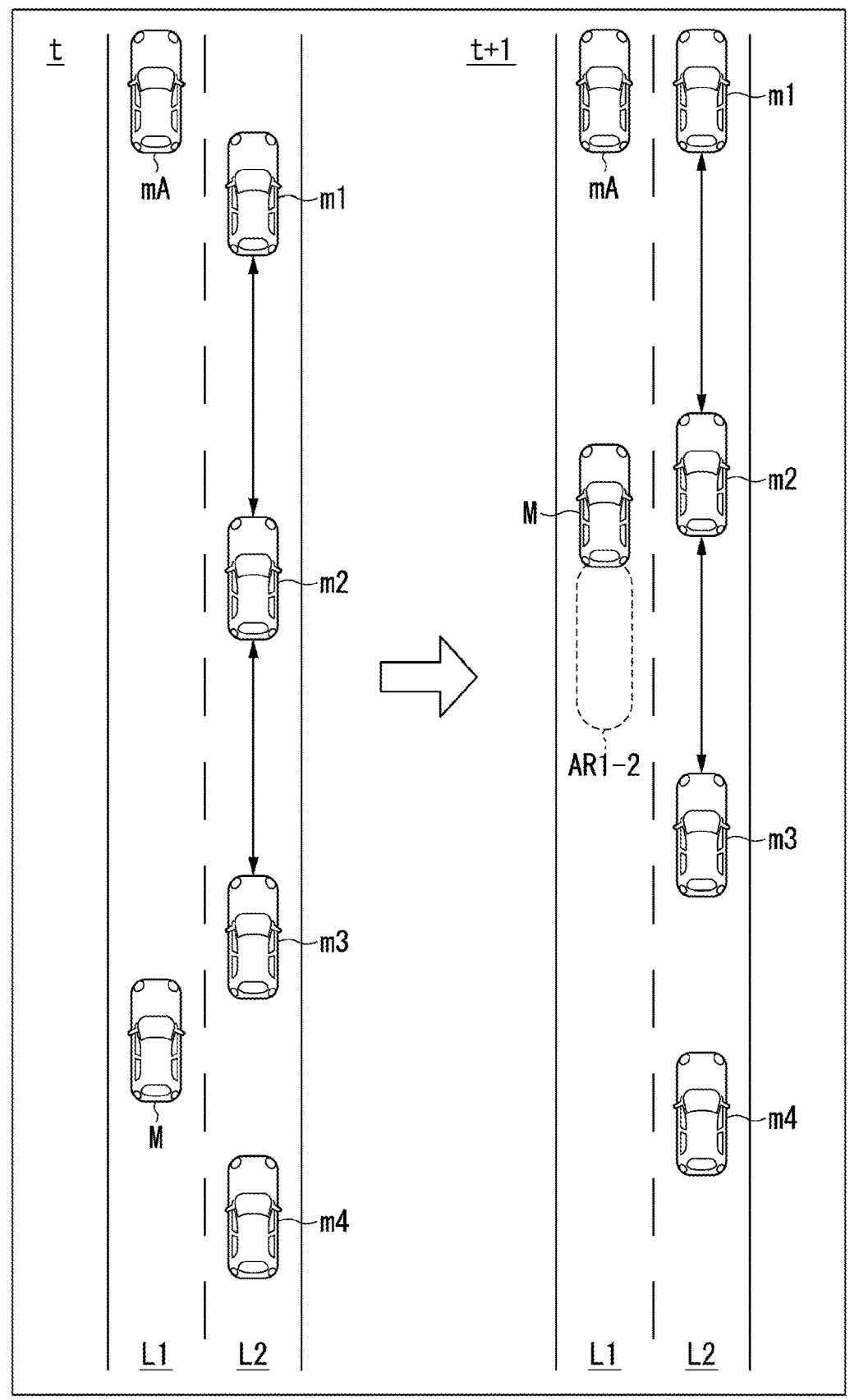
FIG. 5 is a diagram showing a process for specific control (part 2A).

FIG. 5 is a diagram showing a process for specific control (part 2A). A situation of time t of FIG. 5 is similar to the situation of time t of FIG. 3 described above. At this time, the predictor 142 predicts positions of the nearby vehicles and a position to which the vehicle M can move at time t+1. The nearby vehicles include the front vehicle mA, the first vehicle m1, the second vehicle m2, and the third vehicle m3. The positions to which the vehicle M can move are a position at which the vehicle M is predicted to arrive when the vehicle M accelerates at an allowed acceleration.

As shown at time t+1 (a time after a predetermined time) of FIG. 5, when it is predicted that the vehicle M will not arrive at a front side of the second vehicle m2 and can arrive at the vicinity in the side direction of the second vehicle m2, because the vehicle M cannot arrive at the vicinity of the first vehicle m1 and the second vehicle m2, the route changer 144 causes the vehicle M to move to the region AR1-2 in the vicinity of the second vehicle m2 and the third vehicle m3. Here, as a condition, the inter-vehicle distance between the second and first vehicles is equal to or greater than a predetermined distance.

Figure 6:
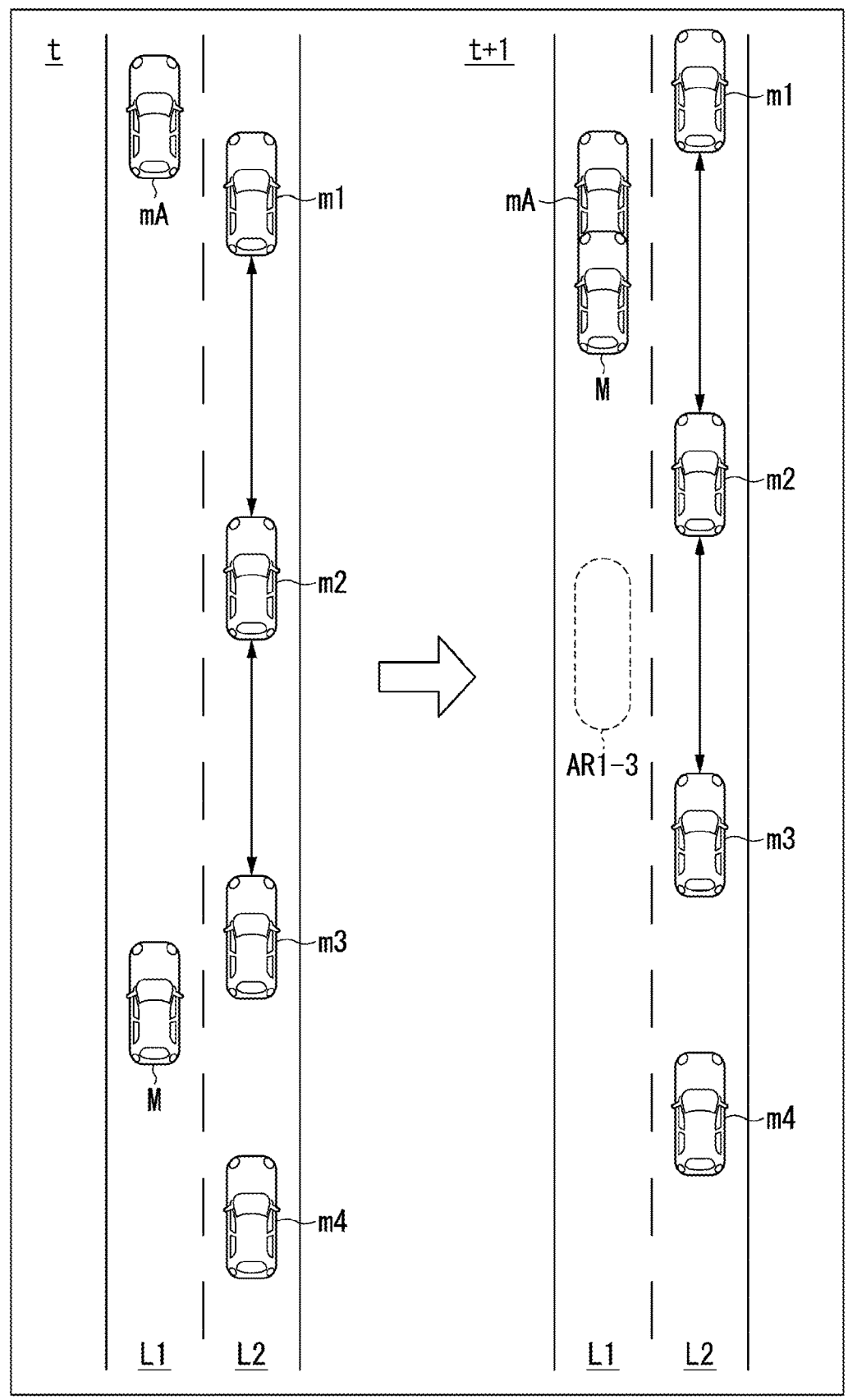
FIG. 6 is a diagram showing a process for specific control (part 2B).

FIG. 6 is a diagram showing a process for specific control (part 2B). A situation of time t of FIG. 6 is similar to the situation of time t of FIG. 3 described above. As shown at time t+1 of FIG. 6, when it is predicted that the vehicle M can arrive at the vicinity of the first vehicle m1 and the front vehicle mA is located in the vicinity of the first vehicle m1, the route changer 144 causes the vehicle M to move to a region AR1-3 in a vicinity of the second vehicle m2 and the third vehicle m3 because of interference between the vehicle M and the front vehicle mA.

In this way, since the route changer 144 causes the vehicle M to move based on a prediction result of the predictor 142, the vehicle M can be controlled with high precision in accordance with a surrounding situation.

The predictor 142 may perform prediction as follows. The predictor 142 predicts a time of arrival at a reference position in front of the vehicle M and a distribution of positions of vehicles near the vehicle M at the time and specifies a nearby vehicle in the side direction of or behind the vehicle M as the second vehicle at the time. The reference position is, for example, a front side at a predetermined distance from the current position of the vehicle M. The reference position is, for example, a front at the predetermined distance from a position determined when the change in the lane is completed.

Specifically, when it is assumed that the vehicle M accelerates at an allowed acceleration, the predictor 142 predicts a time at which the vehicle M will arrive at the reference position at several tens to several hundreds of meters. For example, this time is referred to as time X. The predictor 142 predicts a distribution of positions of the nearby vehicles of the vehicle at time X based on past traveling states of the nearby vehicles. The predictor 142 specifies a vehicle near (for example, in the side direction of or behind) the vehicle M at time X as the second vehicle. Here, as a condition, the inter-vehicle distance between the specified second and first vehicles is equal to or greater than the predetermined distance.

Even when the reference position is determined in this way, the route changer 144 can realize control of the vehicle M in accordance with the surrounding situation based on a prediction result of the predictor 142. As a result, it is possible to raise a probability that the vehicle M will complete the change in the lane before arriving at the predetermined position.

[Summary of Specific Control (Part 2)]

The route changer 144 may specify two vehicles forming the longest inter-vehicle distance among the nearby vehicles in the side direction of or behind the vehicle M at the foregoing time (time t+1) as the first and second vehicles. The route changer 144 may specify two vehicles forming an inter-vehicle distance equal to or greater than a predetermined value among the nearby vehicles in the side direction of or behind the vehicle M at the foregoing time (time t+1) as the first and second vehicles. The inter-vehicle distance equal to or greater than the predetermined value includes, for example, an inter-vehicle distance that is shorter than the longest inter-vehicle distance by a predetermined distance.

The route changer 144 may specify a vehicle which forms the inter-vehicle distance equal to or greater than the predetermined value and is closest to the vehicle M among the nearby vehicles in the side direction of or behind the vehicle M as the second vehicle at the foregoing time (time t+1), and may specify a vehicle in front of the second vehicle as the first vehicle. In this way, the route changer 144 can specify two vehicles appropriate for the surrounding situation as the first and second vehicles based on a prediction result of the predictor 142.

[Others]

The predictor 142 may specify the first vehicle in front of the target region of the vehicle M and the second vehicle behind the target region based on a time which the vehicle M approaches each target vehicle included in the plurality of vehicles, and an inter-vehicle distance between the target vehicle and a vehicle in front of the target vehicle or a vehicle behind the target vehicle at the time at which the vehicle M approaches each target vehicle. The time the vehicle M approaches each target vehicle is derived based on displacements of speeds of the plurality of vehicles and an allowed acceleration of the vehicle M. In this case, the predictor 142 specifies, as the first and second vehicles, two vehicles forming a long inter-vehicle distance (or a distance equal to or greater than a threshold and an inter-vehicle distance in front) between a first target vehicle and a vehicle in front of the first target vehicle or a vehicle behind the first target vehicle at a time at which the vehicle M approaches the first target vehicle, and an inter-vehicle distance between a second target vehicle and a vehicle in front of the second target vehicle or a vehicle behind the second target vehicle at a time at which the vehicle M approaches the second target vehicle. When the time at which the vehicle M approaches a target vehicle is greater than a set time, the vehicle M excludes the target vehicle from vehicles which the vehicle M approaches. The "target vehicle" is a target vehicle with which an inter-vehicle distance is derived.

As described above, even when the time is determined, the route changer 144 can realize the control of the vehicle M in accordance with a surrounding situation based on a prediction result of the predictor 142. For example, the route changer 144 can change the lane to a region that the vehicle M approaches until a set time and in which the inter-vehicle distance is the longest. As a result, the vehicle M can raise a probability of the change in the lane being completed before the predetermined time passes and can change the lane to a more appropriate region.

[Specific Control (Part 3)]

When the vehicle M is caused to express an intention to change a route and the second vehicle is predicted to have no intention to permit the change in the route, the route changer 144 causes the vehicle to change its lane to the front of a vehicle which is behind the second vehicle.

Figure 7:
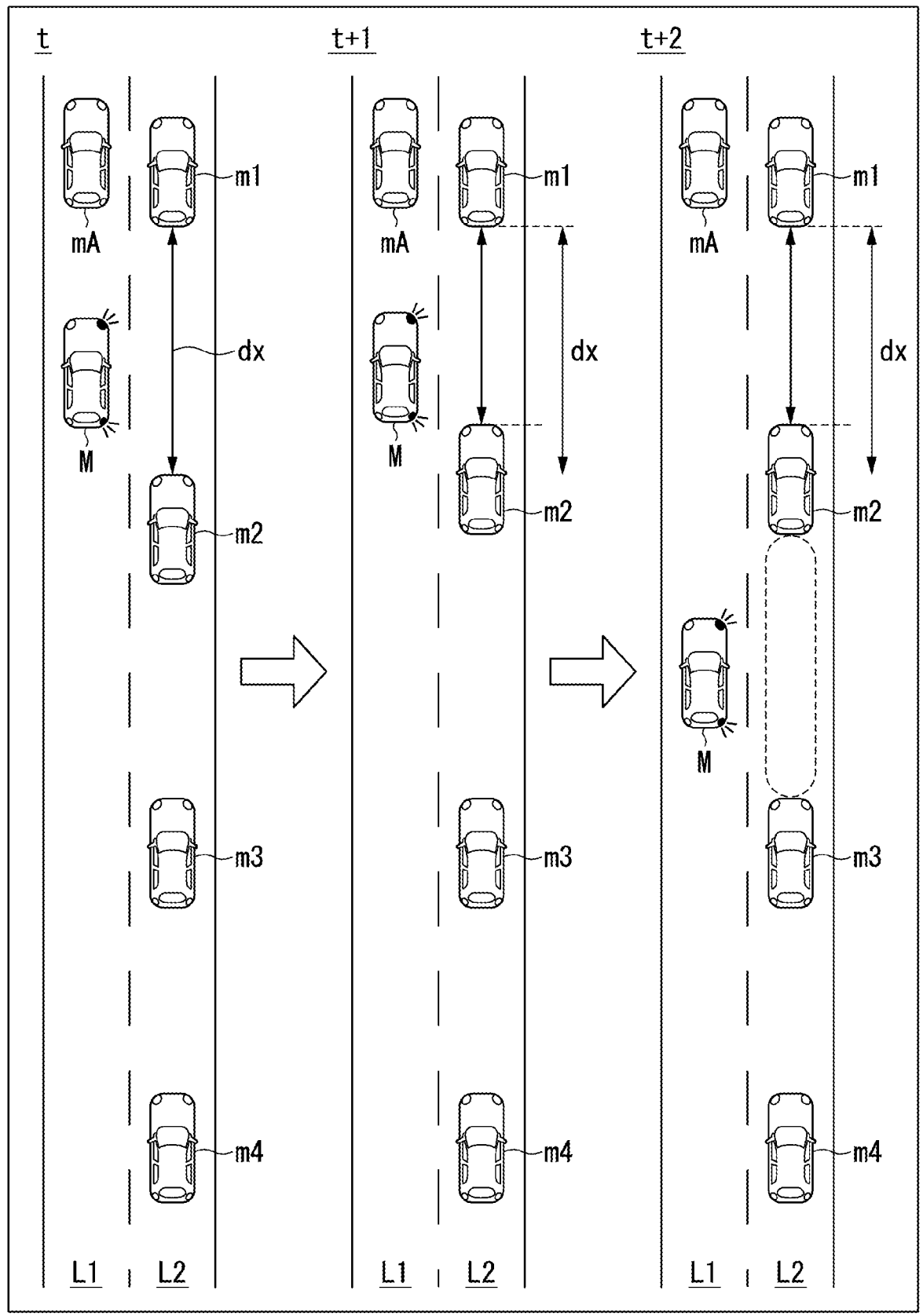
FIG. 7 is a diagram showing a process for specific control (part 3).

FIG. 7 is a diagram showing a process for specific control (part 3). The vehicle M is assumed to determine to perform changing its lane to a space between the first vehicle m1 and the second vehicle m2. At time t, it is assumed that the vehicle M is located near the first vehicle m1 and the second vehicle m2 and blinks direction indicators to express a change in the lane. That is, the vehicle M is assumed to express an intention to change the route. At time t+1, for example, the second vehicle m2 perform an action of decreasing the inter-vehicle distance or does not lengthening the inter-vehicle distance.

In this way, when the second vehicle m2 is predicted to have no intention to permit the change in the route, the vehicle M is located near the second vehicle m2 and the third vehicle m3 and changes its lane to a space between the second vehicle m2 and the third vehicle m3 at time t+2. Then, for example, when the third vehicle m3 is predicted to have an intention to permit the change in the route, the vehicle M changes its lane to the space between the second vehicle m2 and the third vehicle m3.

Here, whether the vehicle (the second vehicle m2 or the third vehicle m3) behind the vehicle M has the intention to permit the change in the route of the vehicle M may be determined based on a score. For example, the route changer 144 determines whether a rear vehicle satisfies a preliminary condition for each predetermined time. When the rear vehicle satisfies the preliminary condition, the route changer 144 grants a positive score to the rear vehicle. When the rear vehicle does not satisfy the preliminary condition, the route changer 144 grants a negative score to the rear vehicle. When an accumulated positive score exceeds a threshold Th1, the route changer 144 determines that the rear vehicle has an intention to permit the change in the lane of the vehicle M. When the accumulated negative score exceeds a threshold Th2, the route changer 144 determines that the rear vehicle has no intention to permit the change in the lane of the vehicle M.

The preliminary condition is, for example, the following condition.

(A) A specific inter-vehicle distance between a rear vehicle and a front vehicle of the rear vehicle is equal to or greater than a threshold. For example, when the specific inter-vehicle distance is equal to or greater than the threshold, a positive score is granted to the rear vehicle. When the specific inter-vehicle distance is less than the threshold, a negative score is granted to the rear vehicle.

(B) For example, a speed of a rear vehicle is less than a speed a predetermined time before, a speed difference between a speed (a speed A) of a rear vehicle and a speed (a speed B greater than the speed A) of the vehicle M is greater than a speed difference a predetermined time before, a speed of a rear vehicle is less than a speed of the vehicle M by a predetermined speed, a speed of a rear vehicle decreases in a state in which a speed of a vehicle in front of the rear vehicle is not changed, or a speed of a rear vehicle is less than a speed of the vehicle M in a state in which a speed of a vehicle in front of the rear vehicle is not changed.

The route changer 144 may predict an intention of the rear vehicle to yield the route to the vehicle M, evaluate a prediction result, and derive a positive score or a negative score based on the prediction result. For example, the route changer 144 may statistically process a score which is based on the length of an inter-vehicle distance between a rear vehicle and a vehicle in front of the rear vehicle and a score which is based on an index regarding a state of the rear vehicle (for example, variability of a speed of the rear vehicle, a relative speed of the vehicle M to the rear vehicle, variability of the relative speed, or the like), derive a score, and derive a positive score or a negative score based on the derived score. The route changer 144 may input an inter-vehicle distance between the rear vehicle and a vehicle in front of the rear vehicle (for example, variability of a speed) and an index regarding a state of the rear vehicle to a predetermined function, derive a score, compare the derived score with a threshold, and determine whether the rear vehicle has an intention to permit the change in the lane of the vehicle M.

[Specific Control (Part 4)]

Figure 8:
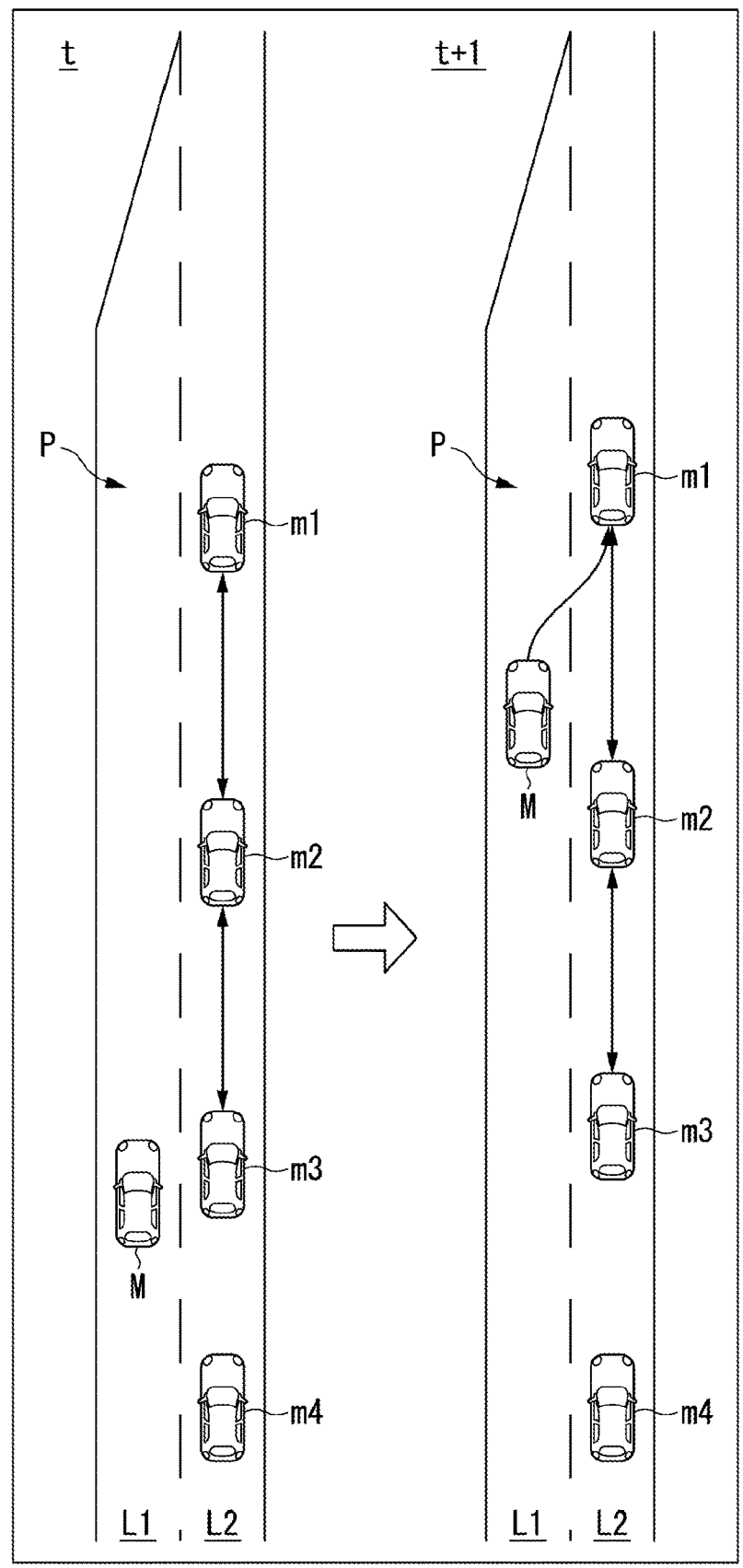
FIG. 8 is a diagram showing a process for specific control (part 4).

Even when the first lane L1 in which the vehicle M is traveling closes ahead, each of the above-described processes may be performed. FIG. 8 is a diagram showing a process for specific control (part 4). For example, when the first lane L1 is a joining road and the second lane L2 is a main lane, it is necessary for the vehicle M to change its lane to the second lane L2 before the first lane L1 closes. A position at which the lane closes or a position before the position (P in the drawing) in [Specific control (part 4)] is an example of a "reference position."

In this case, the vehicle M can change its lane to the second lane L2 at time t+1 by performing the above-described processes.

[Specific Control (Part 5)]

Figure 9:
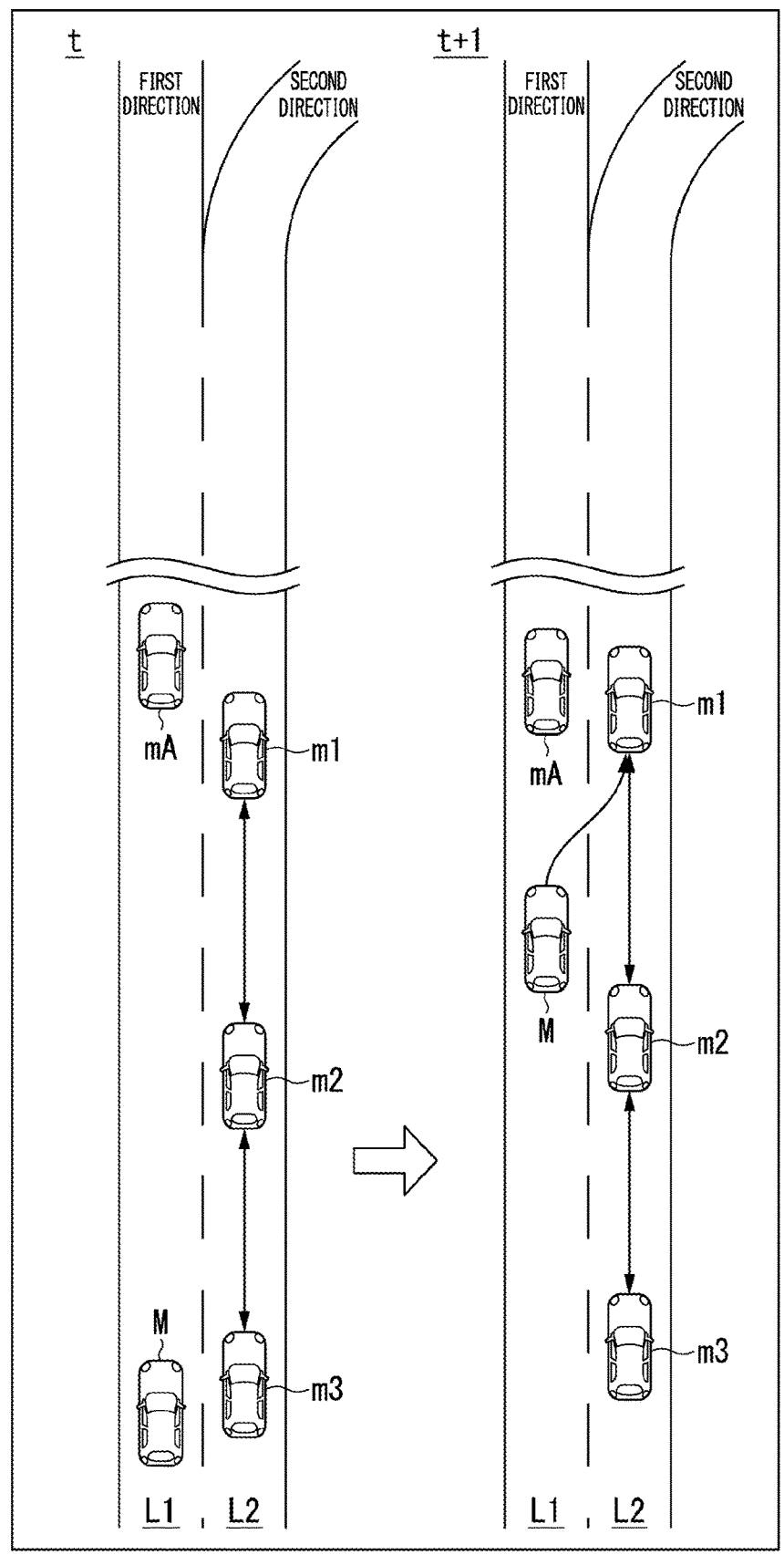
FIG. 9 is a diagram showing a process for specific control (part 5).

When the first lane L1 and the second lane L2 branch ahead and the vehicle M is traveling in the second lane L2 toward a destination, each of the above-described processes may be performed. FIG. 9 is a diagram showing a process for specific control (part 5). For example, when the first lane L1 is a lane oriented in a first direction, the second lane L2 is a lane oriented in a second direction, and the vehicle M is headed in the second direction, it is necessary to change the lane to the second lane L2 before the first lane L1 and the second lane L2 branch. A position at which the first lane L1 and the second lane L2 branch or a position before the position in [Specific control (part 5)] is an example of a "reference position."

In this case, the vehicle M can change its lane to the second lane L2 at time t+1 by performing the above-described processes.

[Flowchart]

Figure 10:
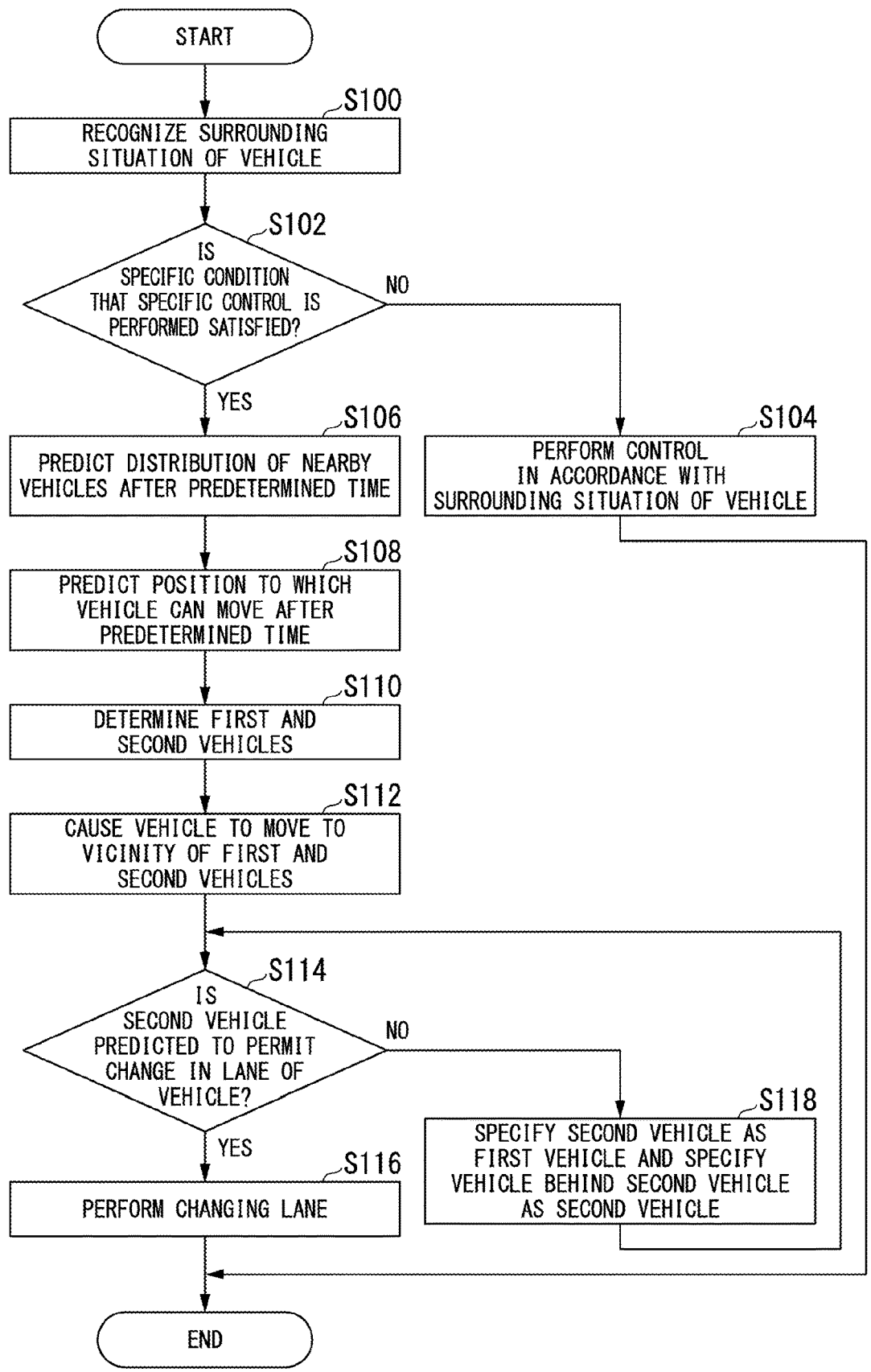
FIG. 10 is a flowchart showing an example of a flow of a process performed by an automated driving control device.

FIG. 10 is a flowchart showing an example of a flow of a process performed by an automated driving control device 100. First, the recognizer 130 recognizes a surrounding situation of the vehicle M (step S100). Subsequently, the action plan generator 140 determines whether the specific condition that the specific control is performed is satisfied (step S102).

The "specific condition" is, for example, that a vehicle speed of a vehicle which is at least in a lane (the second lane L2) of a changing destination of the vehicle M is equal to or greater than a predetermined vehicle speed. For example, an average vehicle speed per unit time of vehicles which are vehicles near the vehicle M and vehicles traveling in the second lane L2 is equal to or greater than a predetermined value. Hereinafter, this condition is referred to as a first specific condition. The predetermined value is, for example, a value based on an average speed of vehicles traveling in the traveling lane in which the vehicle M is traveling.

The "specific condition" is, for example, that a distance between the vehicle M and a vehicle (the front vehicle mA) in front of the vehicle M at least in the lane in which the vehicle M is traveling is equal to or greater than a predetermined distance. Hereinafter, this condition is referred to as a second specific condition. The specific condition may be a condition in which the first and second specific conditions are satisfied. In other words, the specific condition may be, for example, a state in which there is no congestion in the first lane L1 and the second lane L2. The congestion is, for example, a state in which nearby vehicles are traveling at low speeds (for example, equal to or less than 30 or 40 km/hour) or a state in which nearby vehicles repeat stopping and traveling.

FIG. 10 is referred to back for description. When the specific condition in which the specific control is performed is not satisfied, the action plan generator 140 performs control in accordance with a surrounding situation of the vehicle M (step S104). When the specific condition is not satisfied, the action plan generator 140 performs different control from the specific control. The different control is, for example, control that the vehicle M continues traveling in the first lane L1, control that the vehicle M approaches the second lane L2 and more strongly expresses an intention to perform changing the lane to the second lane L2, or control that the vehicle M re-searches for a route for heading for a destination again and performs traveling based on a re-searching result.

When the specific condition that the specific control is performed is satisfied, the predictor 142 predicts a distribution of positions of the nearby vehicles after a predetermined time (step S106). Subsequently, the predictor 142 predicts a position to which the vehicle can move after the predetermined time (step S108). Subsequently, the route changer 144 specifies the first and second vehicles based on the prediction results of steps S106 and S108 (step S110). For example, two vehicles are specified as the first and second vehicles. The two vehicles forming the longest inter-vehicle distance among inter-vehicle distances formed between vehicles in the traveling direction behind a position to which the vehicle M can move after the predetermined time. The two vehicles forming an inter-vehicle distance equal to or greater than a predetermined distance, and/or the foremost inter-vehicle distance.

Subsequently, the route changer 144 causes the vehicle M to move to a vicinity of the first and second vehicles (step S112). Subsequently, the route changer 144 determines whether the second vehicle is predicted to permit the change in the lane of the vehicle M (step S114). When the second vehicle is predicted to permit the change in the lane of the vehicle M, the route changer 144 performs changing the lane (step S116). For example, when the second vehicle performs a predetermined behavior, the second vehicle is predicted to permit the change in the lane. The predetermined behavior is, for example, blinking (passing) of lights, deceleration, suppression of acceleration, a behavior for lengthening an inter-vehicle distance.

When the second vehicle is not predicted to permit the change in the lane of the vehicle M, the route changer 144 specifies the second vehicle as the first vehicle and specifies a vehicle behind the specified first vehicle as the second vehicle (step S118), and then the process proceeds to step S114. When the processes of steps S114 and S118 are repeated a predetermined number of times, the process ends and another process may be performed. The other process is, for example, control that the vehicle maintains the traveling in the traveling lane without changing the lane or control that the vehicle approaches the lane of the lane changing destination. Then, the process of the flowchart ends.

In this way, the automated driving control device 100 can realize control in accordance with a surrounding situation by specifying the first and second vehicles, causing the vehicle to move to the vicinity of the first and second vehicles, and performing changing the lane in a situation in which the specific condition is satisfied.

For example, when the vehicle M can head for the destination more quickly in the traveling of an adjacent lane than in the traveling lane or necessity to travel in the adjacent lane is high, the vehicle M moves to the vicinity of the first and second vehicles so that the route can be changed to the adjacent lane. Then, the vehicle M can change the route to the space between the first and second vehicles and change the route. For example, at this time, the route changer 144 can head for the destination quickly by forming an inter-vehicle distance equal to or greater than the predetermined distance, specifying the vehicles farther in front as the first and second vehicles, and changing the lane to a space between these vehicles.

According to the above-described first embodiment, the automated driving control device 100 can control the vehicle with higher precision in accordance with the surrounding situation by causing the vehicle to move to the vicinity of the first and second vehicles specified in the lane in which the vehicle M is traveling.

Second Embodiment

Hereinafter, a second embodiment will be described. An automated driving control device 100A according to the second embodiment selectively performs any one mode among a plurality of modes including a mode in which specific control is performed. Hereinafter, differences from the first embodiment will be mainly described.

Figure 11:
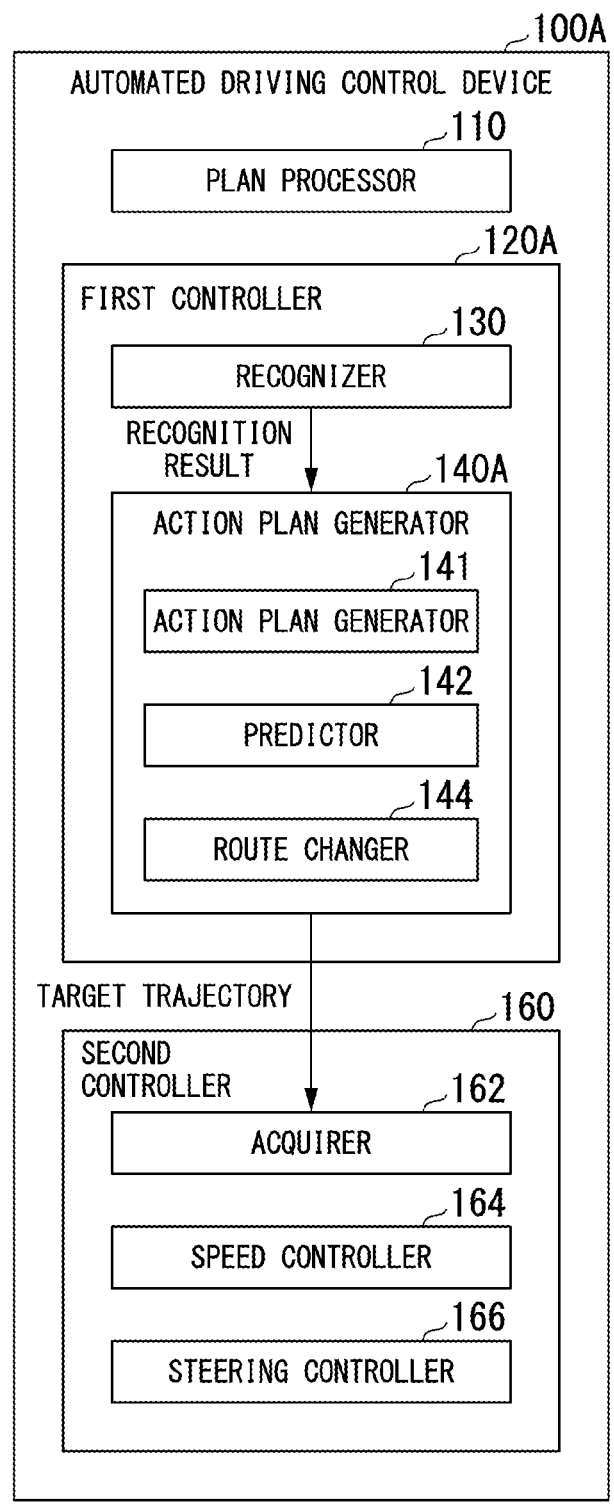
FIG. 11 is a diagram showing an example of a functional configuration of an automated driving control device according to a second embodiment.

FIG. 11 is a diagram showing an example of a functional configuration of the automated driving control device 100A according to the second embodiment. The automated driving control device 100A includes, for example, a plan processor 110, a first controller 120A, and a second controller 160.

The plan processor 110 predicts whether a vehicle can arrive at a set destination at a target time based on information supplied by the navigation device 50. The target time may be a time designated when a destination is set or may be a time designated after the vehicle M starts traveling after the destination is set. Based on a position of the vehicle M, a traffic situation to the destination, or the like, the plan processor 110 determines whether the vehicle M can arrive at the destination at the target time. Some or all of the processes in the plan processor 110 may be performed in another functional configuration of the navigation device 50 or the like. In this case, the other functional configuration supplies a determination result to the automated driving control device 100A.

The first controller 120A includes, for example, the recognizer 130 and an action plan generator 140A. The action plan generator 140A includes, for example, the mode setter 141, the predictor 142, and the route changer 144.

The mode setter 141 sets one mode among a plurality of modes. The action plan generator 140 performs the mode set by the mode setter 141 to control the vehicle M.

Figures 12, 13:
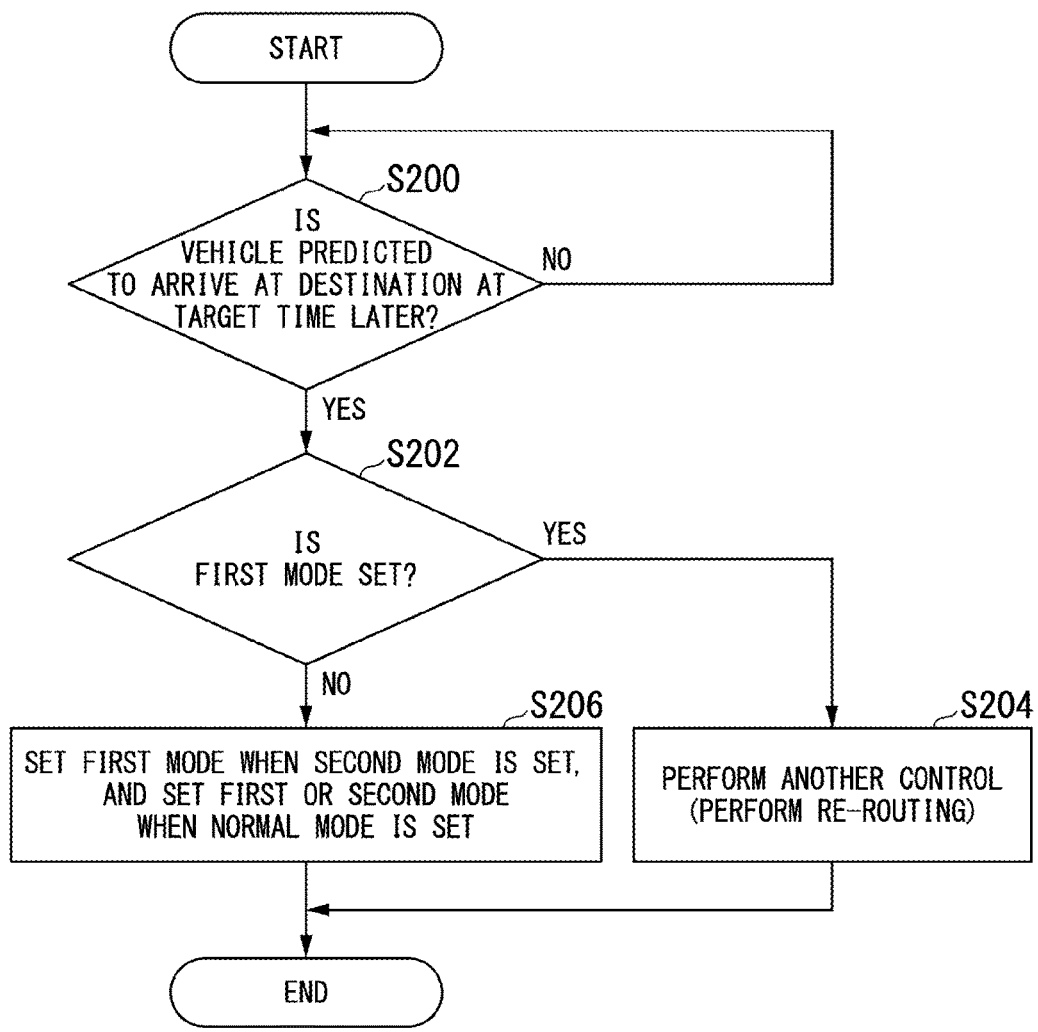
FIG. 12 is a diagram showing an example of a mode which can be set by a mode setter.
FIG. 13 is a flowchart showing an example of a flow of a process performed by the automated driving control device according to the second embodiment.

FIG. 12 is a diagram showing an example of a mode which can be set by the mode setter 141. For example, settable modes include, for example, a first mode, a second mode, and a normal mode. The first and second modes are examples of "specific control modes." The first mode is a mode in which first specific control is performed. The first specific control is a mode in which a first acceleration is allowed. The second mode is a mode in which second specific control is performed. The second specific control is a mode in which a second acceleration less than the first acceleration is allowed without allowing the first acceleration. The normal mode is a mode in which the specific control is not performed. The normal mode is a mode in which control that a lane is changed to the second lane L2 quickly when the vehicle M is traveling in the first lane L1 is not performed.

The predictor 142 predicts a position to which the vehicle M can move after a predetermined time using the first acceleration or the second acceleration associated with the set mode when the predictor 142 predicts a position to which the vehicle M can move after the predetermined time.

FIG. 13 is a flowchart showing an example of a flow of a process performed by the automated driving control device 100A according to the second embodiment. First, the plan processor 110 determines whether the vehicle M is predicted to arrive at a destination later than a target time (step S200). When the vehicle M is predicted to arrive at the destination later than the target time, the route changer 144 determines whether the mode setter 141 sets the first mode (step S202). When the first mode is set, the automated driving control device 100A performs another control (step S204). For example, the plan processor 110 causes the navigation device 50 to perform re-routing (search for another route) to arrive at the destination at the target time.

When the first mode is not set and the second mode is set, the mode setter 141 changes the setting to the first mode. When the normal mode is set, the setting is changed to the first mode or the second mode (step S206). For example, when a time at which the vehicle M is predicted to arrive at the destination is later than the target time by a predetermined time or more, the first mode is set. When the time at which the vehicle M is predicted to arrive at the destination is not later than the target time by the predetermined time or more, the second mode is set. At this time, the automated driving control device 100A may question an occupant about whether the mode is permitted to be changed using the HMI 30. When the occupant performs a predetermined operation indicating that the mode is permitted to be changed on the HMI 30 or the like, the mode setter 141 may change the mode.

In this way, when it is necessary for the vehicle M to head for the destination quickly, the automated driving control device 100A can set the mode in which the specific control is performed and perform the specific control so that the vehicle M can head quickly. As a result, convenience for a user is improved.

Instead of (in addition to) changing the mode automatically, the user may perform a predetermined operation to change the mode. For example, the user may operate the HMI 30 and make a predetermined speech and instructs the mode setter 141 to set the first mode, the second mode, or the normal mode.

According to the above-described second embodiment, when the specific control mode is selected, the automated driving control device 100A causes the vehicle to move to the vicinity of the first and second vehicles. When the vehicle M is predicted to arrive at the set destination later than the target time, the automated driving control device 100A can cause the vehicle M to head for the destination quickly by performing the specific control mode. As a result, convenience for a user is improved.

[Hardware Configuration]

Figure 14:
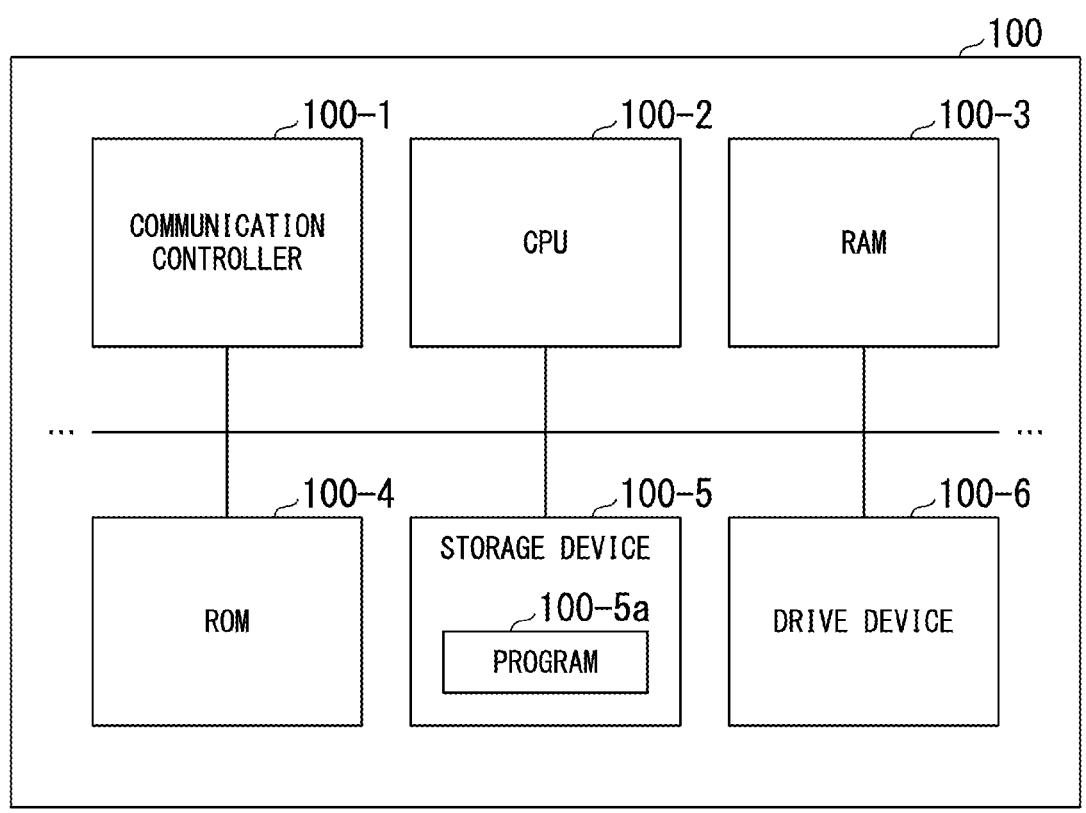
FIG. 14 is a diagram showing an example of a hardware configuration of the automated driving control device according to an embodiment.

FIG. 14 is a diagram showing an example of a hardware configuration of the automated driving control device 100 according to an embodiment. As shown, the automated driving control device 100 is configured such that a communication controller 100-1, a CPU 100-2, a random access memory (RAM) 100-3 that is used as a working memory, a read-only memory (ROM) 100-4 that stores a boot program or the like, a storage device 100-5 such as a flash memory or a hard disk drive (HDD), a drive device 100-6, and the like are connected to each other via an internal bus or a dedicated communication line. The communication controller 100-1 performs communication with constituent element other than the automated driving control device 100. The storage device 100-5 stores a program 100-5a that is executed by the CPU 100-2. The program is loaded on the RAM 100-3 by a direct memory access (DMA) controller (not shown) to be executed by the CPU 100-2. Thus, some or all of the recognizer 130 and the action plan generator 140 are realized.

The above-described embodiment can be expressed as follows:

a vehicle control device including a storage device that stores a program and a hardware processor, the hardware processor executing the program stored in the storage device to perform:

recognizing a surrounding situation of a vehicle;

controlling an action of the vehicle;

specifying a first vehicle in front of a region which the vehicle is scheduled to enter and a second vehicle behind the region based on inter-vehicle distances between a plurality of vehicles located in front of or on the side of the vehicle in a lane of a route changing destination recognized by the recognizer when a route of the vehicle is changed to a side; and causing the vehicle to move to a vicinity of the specified first and second vehicles in a lane in which the vehicle is traveling.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
a memory that stores instructions; and
one or more processors that execute the instructions to cause the vehicle control system to:
recognize a surrounding situation of a vehicle; and
control an action of the vehicle,
specify a first vehicle in front of a region which the vehicle is scheduled to enter and a second vehicle behind the region according to inter-vehicle distances between a plurality of vehicles located in front of or to a side of the vehicle in a lane of a route changing destination when a route of the vehicle is changed to a side,
when a difference between a first inter-vehicle distance between the plurality of vehicles and a second inter-vehicle distance between the plurality vehicles is equal to or less than a threshold, wherein the second inter-vehicle distance is longer than the first inter-vehicle distance, specify two vehicles forming the first inter-vehicle distance as the first and second vehicles, wherein the first vehicle is a vehicle that is in front of two vehicles forming the second inter-vehicle distance, and
cause the vehicle to move to a vicinity of the first and second vehicles in a lane in which the vehicle is traveling.

2. The vehicle control device according to claim 1, wherein the first and second vehicles are two vehicles forming a longest inter-vehicle distance between the plurality of vehicles.

3. The vehicle control device according to claim 1, wherein the first vehicle is a forefront vehicle among the vehicles forming the first inter-vehicle distance.

4. The vehicle control device according to claim 1, wherein the one or more processors execute the instructions to further cause the vehicle control system to
predict a distribution of positions to which the vehicle is able to move and a position of one or more other vehicles within a range of the vehicle at a time after a predetermined time, and
specify, as the second vehicle, another vehicle that is in a side direction of the position to which the vehicle is able to move or is behind the position at the time after the predetermined time.

5. The vehicle control device according to claim 4, wherein the one or more processors execute the instructions to further cause the vehicle control system to
specify, as the first and second vehicles, two vehicles forming a longest inter-vehicle distance among nearby vehicles in the side direction of or behind the vehicle at the time,
specify, as the first and second vehicles, two vehicles forming an inter-vehicle distance equal to or greater than a predetermined value among the nearby vehicles in the side direction of or behind the vehicle at the time, or
specify, as the second vehicle, a vehicle that forms the inter-vehicle distance that is equal to or greater than the predetermined value and is closest to the vehicle among the nearby vehicles in the side direction of or behind the vehicle at the time, and
specify a vehicle in front of the second vehicle as the first vehicle.

6. The vehicle control device according to claim 1, wherein the one or more processors execute the instructions to further cause the vehicle control system to
predict a time of arrival at a reference position in front of the vehicle and a distribution of positions of vehicles near the vehicle at the time, and
specify a nearby vehicle that is in a side direction of or behind the vehicle at the time as the second vehicle.

7. The vehicle control device according to claim 1, wherein the one or more processors execute the instructions to further cause the vehicle control system to change the route to a region between the first and second vehicles after causing the vehicle to move to a vicinity of sides of the first and second vehicles.

8. The vehicle control device according to claim 7, wherein the one or more processors execute the instructions to further cause the vehicle control system to
cause the vehicle to express an intention to change the route, and
instruct the vehicle to change the route to a front of the vehicle that is behind the second vehicle in response to predicting that the second vehicle will not permit the change in the route.

9. The vehicle control device according to claim 1, wherein the one or more processors execute the instructions to further cause the vehicle control system to
perform control such that the vehicle moves to a vicinity of sides of the first and second vehicles when a vehicle speed of another vehicle which is at least in the lane of the route changing destination of the vehicle is equal to or greater than a predetermined vehicle speed, and
perform different control from the control such that the vehicle moves to the vicinity of the sides of the first and second vehicles in response to determining that the vehicle speed of the other vehicle is less than a predetermined vehicle speed.

10. The vehicle control device according to claim 1, wherein the one or more processors execute the instructions to further cause the vehicle control system to
perform control such that the vehicle moves to a vicinity of sides of the first and second vehicles in response to determining that a distance to another vehicle that is in front of the vehicle at least in the lane in which the vehicle is traveling is equal to or greater than a predetermined distance, and
perform other control different from the control such that the vehicle moves to the vicinity of the sides of the first and second vehicles in response to determining that the distance to the other vehicle is not equal to or greater than the predetermined distance.

11. The vehicle control device according to claim 1, wherein the one or more processors execute the instructions to further cause the vehicle control system to
perform a mode selected from a plurality of modes including at least a specific control mode, and
cause the vehicle to move to a vicinity of the first and second vehicles in the lane in which the vehicle is traveling when the specific control mode is selected.

12. The vehicle control device according to claim 1, wherein the one or more processors execute the instructions to further cause the vehicle control system to perform a mode selected from a plurality of modes including at least a specific control mode and perform the specific control mode when the vehicle is predicted to arrive at a set destination later than a target time, and
wherein the specific control mode causes the vehicle to move to a vicinity of the first and second vehicles in the lane in which the vehicle is traveling.

13. A vehicle control method causing a computer to perform:
recognizing a surrounding situation of a vehicle;
controlling an action of the vehicle;
specifying a first vehicle in front of a region which the vehicle is scheduled to enter and a second vehicle behind the region according to inter-vehicle distances between a plurality of vehicles located in front of or to a side of the vehicle in a lane of a route changing destination when a route of the vehicle is changed to a side, wherein the specifying comprises:
in response to determining that a difference between a first inter-vehicle distance between the plurality of vehicles and a second inter-vehicle distance between the plurality vehicles is equal to or less than a threshold, the second inter-vehicle distance being longer than the first inter-vehicle distance, specifying two vehicles forming the first inter-vehicle distance as the first and second vehicles, wherein the first vehicle is in front of two vehicles forming the second inter-vehicle distance; and
causing the vehicle to move to a vicinity of the first and second vehicles in a lane in which the vehicle is traveling.

14. The vehicle control method of claim 13, wherein the first and second vehicles are two vehicles forming a longest inter-vehicle distance between the plurality of vehicles.

15. The vehicle control method of claim 13, wherein the first vehicle is a forefront vehicle among the vehicles forming the first inter-vehicle distance.

16. A non-transitory computer-readable storage medium that is configured to store a computer program to be executed by a computer to perform at least:
recognizing a surrounding situation of a vehicle;
controlling an action of the vehicle;
specifying a first vehicle in front of a region which the vehicle is scheduled to enter and a second vehicle behind the region according to inter-vehicle distances between a plurality of vehicles located in front of or to a side of the vehicle in a lane of a route changing destination when a route of the vehicle is changed to a side, wherein the specifying comprises:
when a difference between a first inter-vehicle distance between the plurality of vehicles and a second inter-vehicle distance between the plurality vehicles is equal to or less than a threshold, wherein the second inter-vehicle distance is longer than the first inter-vehicle distance, specify two vehicles forming the first inter-vehicle distance as the first and second vehicles, wherein the first vehicle is in front of two vehicles forming the second inter-vehicle distance; and
causing the vehicle to move to a vicinity of the first and second vehicles in a lane in which the vehicle is traveling.

* * * * *